UNITED STATES PATENT OFFICE.

ROLAND HEINRICH SCHOLL, OF KARLSRUHE, AND MAX ALBERT KUNZ, OF MANNHEIM, GERMANY, ASSIGNORS TO BADISCHE ANILIN & SODA FABRIK, OF LUDWIGSHAFEN-ON-THE-RHINE, GERMANY, A CORPORATION.

PROCESS OF PREPARING ANTHRAQUINONE COMPOUNDS.

No. 845,129.    Specification of Letters Patent.    Patented Feb. 26, 1907.

Application filed February 6, 1906. Serial No. 299,882.

*To all whom it may concern:*

Be it known that we, ROLAND HEINRICH SCHOLL, professor of chemistry and doctor of philosophy, and MAX ALBERT KUNZ, doctor of philosophy and chemist, respectively a subject of the King of Bavaria and Grand Duke of Baden, and a citizen of the Swiss Republic, residing at Karlsruhe and Mannheim in the Grand Duchy of Baden, German Empire, have invented new and useful Improvements in Processes for Preparing Anthraquinone Compounds, of which the following is a specification.

In the specification of the application for Letters Patent Serial No. 299,776, filed February 6, 1906, is described a new class of compounds—namely, those in which two anthraquinone residues are combined together. These compounds are there called "dianthraquinonyl" compounds, and they are prepared by heating a halogen anthraquinone with a metal—such, for instance, as copper—which has the power of withdrawing the halogen.

We have now discovered a new process whereby these same dianthraquinonyl compounds can be obtained. In carrying out our invention we treat a diazo anthraquinone compound with a metal, so that the diazo groups are split off and the residues combine together. For instance, in order to obtain the 2.2'-dimethyl-1.1'-dianthraquinonyl which is claimed specifically in the aforementioned specification, we convert 1-amido-2-methyl-anthraquinone into its diazo sulfate and then treat this with copper in the presence of acetic anhydrid whereupon the diazo group is split off and the required dianthraquinonyl compound is formed.

The following examples will serve to further illustrate the nature of our invention and the method of carrying it into practical effect, but the invention is not confined to these examples. The parts are by weight.

Example 1: Dissolve twenty (20) parts of 1-amido-2-methyl-anthraquinone in two hundred and fifty (250) parts of sulfuric acid (containing about ninety-seven (97) per cent. of $H_2SO_4$) and add gradually, while stirring, at ordinary temperature eight (8) parts of solid sodium nitrite. As soon as a test portion shows that no unconverted amido compound is present pour the diazo solution onto five hundred (500) parts of ice, allow it to stand for three (3) hours, filter off the diazo sulfate with the aid of the pump and wash with a little cold water, alcohol, and ether, and allow to dry in the air. Then stir in ten (10) parts of 2-methyl-1-diazo-anthraquinone sulfate with sixty (60) parts of acetic anhydrid and add two (2) parts of copper powder, whereupon evolution of nitrogen takes place and a violet solution is obtained from which after a few hours a yellowish-white precipitate separates. Warm for a short time on the water-bath, filter with the aid of the pump, and suspend the precipitate in hot water in order to destroy any acetic anhydrid which may be present. Then treat with dilute nitric acid in order to dissolve any copper powder, and filter off the 2.2'-dimethyl-1.1'-dianthraquinonyl which is thus obtained in a pure form.

Example 2: Dissolve twenty-five (25) parts of 1-amido-anthraquinone in two hundred and fifty (250) parts of ninety-six (96) per cent. sulfuric acid and while at ordinary temperature add a solution of seven and seven-tenths (7.7) parts of sodium nitrite in one hundred (100) parts of ninety-six (96) per cent. sulfuric acid. Pour the diazo solution so obtained onto five hundred (500) parts of ice, allow it to stand for from three (3) to four (4) hours, filter and wash with eleven (11) per cent. sulfuric acid and then with acetone. Introduce the press-cake, which is still damp with acetone, gradually, while stirring, into a mixture of one hundred (100) parts of acetic anhydrid and five (5) parts of copper powder. If the reaction does not set in spontaneously, warm the mixture slightly; but to avoid a too violent reaction the temperature should not rise above forty (40) degrees centigrade. After the press-cake is all added and the evolution of nitrogen ceases continue stirring for from two (2) to three (3) hours, filter off and wash with acetic anhydrid. Introduce the product into water at a temperature of fifty (50) degrees centigrade, decant from unaltered copper, filter, and wash with hot water. The 1.1'-dianthraquinonyl so obtained can be recrystallized from nitrobenzene and forms a greenish-yellow crystalline powder which dissolves in concentrated sulfuric acid, yielding a brown yellow solution.

Example 3: Dissolve one hundred (100) parts of 2-methyl-1-amido-anthraquinone in six hundred (600) parts of ninety-six (96) per cent. sulfuric acid and add a solution of forty (40) parts of sodium nitrite in four hundred (400) parts of ninety-six (96) per cent. sulfuric acid, and then pour the diazo solution so obtained onto twelve hundred (1200) parts of ice. Allow to stand for three (3) hours, filter off the diazo sulfate and wash with a little cold water, alcohol, and ether, and then allow it to dry in the air. Moisten the 2-methyl-1-anthraquinone diazo sulfate with acetone and then introduce it, while stirring, into a mixture of four hundred (400) parts of acetic anhydrid and fifteen (15) parts of zinc-dust. The mixture soon stiffens to a thick brown paste, which after a short time should be slightly warmed for about two (2) hours. Filter off and then treat with warm water in order to remove the acetic anhydrid, and then with dilute hydrochloric acid in order to remove the zinc.

Example 4: Dissolve fifty (50) parts of 4-chlor-2-methyl-1-amido-anthraquinone (obtainable from 2-methyl-1-amido-anthraquinone by treatment with sulfur oxychlorin) in five hundred (500) parts of ninety-six (96) per cent. sulfuric acid and diazotize by means of a solution of fifteen (15) parts of sodium nitrite in two hundred (200) parts of ninety-six (96) per cent. sulfuric acid. Pour the diazo solution onto nine hundred (900) parts of ice and work up as described in the foregoing Example 1. Then slowly introduce the 4-chlor-2-methyl-1-anthraquinone diazo sulfate, while stirring, into a suspension of ten (10) parts of copper powder in one hundred and fifty (150) parts of acetic anhydrid. Evolution of nitrogen soon takes place and the mixture becomes warm. Cool externally so as to keep the temperature below thirty-five (35) degrees centigrade. Stir for a few hours at ordinary temperature, filter off and treat the product obtained as described in Example 2. The 4.4'-dichlor-2.2'-dimethyl-1.1'-dianthraquinonyl so obtained consists of a yellow powder which dissolves in xylene, yielding a yellowish-brown solution.

Now what we claim is—

1. The process for the production of anthraquinone compounds by treating a diazo anthraquinone compound with a metal.

2. The process for the production of anthraquinone compounds by treating a diazo anthraquinone compound with copper powder.

3. The process for the production of 2.2'-dimethyl-1.1'-dianthraquinonyl by treating 2-methyl-anthraquinone-1-diazo-sulfate with copper powder.

In testimony whereof we have hereunto set our hands in the presence of two subscribing witnesses.

ROLAND HEINRICH SCHOLL.
MAX ALBERT KUNZ.

Witnesses:
J. ALEC. LLOYD,
JOH. H. LEUTE.